Jan. 29, 1935.    D. J. JONES    1,989,278
SYSTEM FOR AIR CIRCULATION CONTROL IN HOT AIR FURNACES
Original Filed July 3, 1930    2 Sheets-Sheet 1

Inventor:
David J. Jones.
By
Jones, Addington, Ames & Seibold.
Attorneys.

Jan. 29, 1935.  D. J. JONES  1,989,278
SYSTEM FOR AIR CIRCULATION CONTROL IN HOT AIR FURNACES
Original Filed July 3, 1930   2 Sheets-Sheet 2

Inventor.
David J. Jones,
By
Jones, Addington, Ames & Seibold.
Attorneys.

Patented Jan. 29, 1935

1,989,278

UNITED STATES PATENT OFFICE 1,989,278

SYSTEM FOR AIR CIRCULATION CONTROL IN HOT AIR FURNACES

David J. Jones, Elmhurst, Ill., assignor, by mesne assignments, to Minneapolis-Honeywell Regulator Company, Minneapolis, Minn., a corporation of Delaware Application July 3, 1930, Serial No. 465,470
Renewed May 31, 1933

21 Claims. (Cl. 236—11)

My invention relates to systems for air circulation control in hot air furnaces, with special reference to devices for controlling the air circulation relative to the temperature of the space to be heated and to the temperature in the bonnet of the furnace.

It is common practice to install a furnace in the basement of a building and to depend upon the rising of the hot air through the air flues or risers to the various registers to secure the desired distribution of hot air and maintain a suitable temperature. Heating systems of this kind require considerable attention in order to maintain a desired temperature as the distribution of hot air depends entirely upon the combustion maintained in the furnace. As the circulation of hot air in the system depends upon the heat maintained in the furnace itself, the temperature of the space to be heated will not be maintained at a uniform temperature under different weather conditions. My invention provides a desirable means for automatically maintaining the desired air circulation relative to the room temperature and relative to the temperature maintained in the furnace air chamber.

In practicing my invention I provide an electrically driven fan in the air circulating system of a hot air furnace, the operation of the fan being controlled by a thermo-electric furnace switch responsive to the temperature of the hot air in the chamber of the furnace, and which cooperates with a room thermostat responsive to room temperature to cause the operation of the fan when the furnace temperature reaches a predetermined degree. Heretofore, devices of this character have been unsatisfactory and a very serious difficulty has been experienced in that the fan motor has been turned on and off by the furnace switch, with extraordinary frequency to maintain a desired room temperature. Engineers have previously been unable to remedy this fault.

I have discovered that the difficulties experienced have been due, at least in part, to locating the thermo-electric furnace switch in a wrong location relative to the fan and to the path of cold and hot air currents in the furnace. Heretofore, the furnace switch has been located in the direct path of the cool air as it is forced up from the casing or boot of the furnace and when contact is made in the furnace switch, the fan immediately draws up cold air from the cold air ducts which influences the thermal element of the furnace switch causing it to break the contact and turn off the fan.

In the development of my invention, I have discovered that if the thermostatic element of the furnace switch is so located that it is in contact with the direct flow of hot air from the bonnet instead of being in the flow of comparatively cool air below the fan, the desired control is obtained, and I have accomplished the desired result by placing the fan and furnace switch in certain positions relative to each other and to the air currents in the furnace.

In carefully recorded tests where previous installations have indicated from 15 to 18 starts and stops of the fan motor per hour, my invention under similar conditions has maintained the desired room temperature and indicated from 1 to 4 starts and stops per hour. It is, therefore, one of the objects of my invention to provide a device of the character described in which the starts and stops of the fan motor will be reduced to a minimum.

Further objects will be apparent from the specification and the appended claims.

Figure 1:
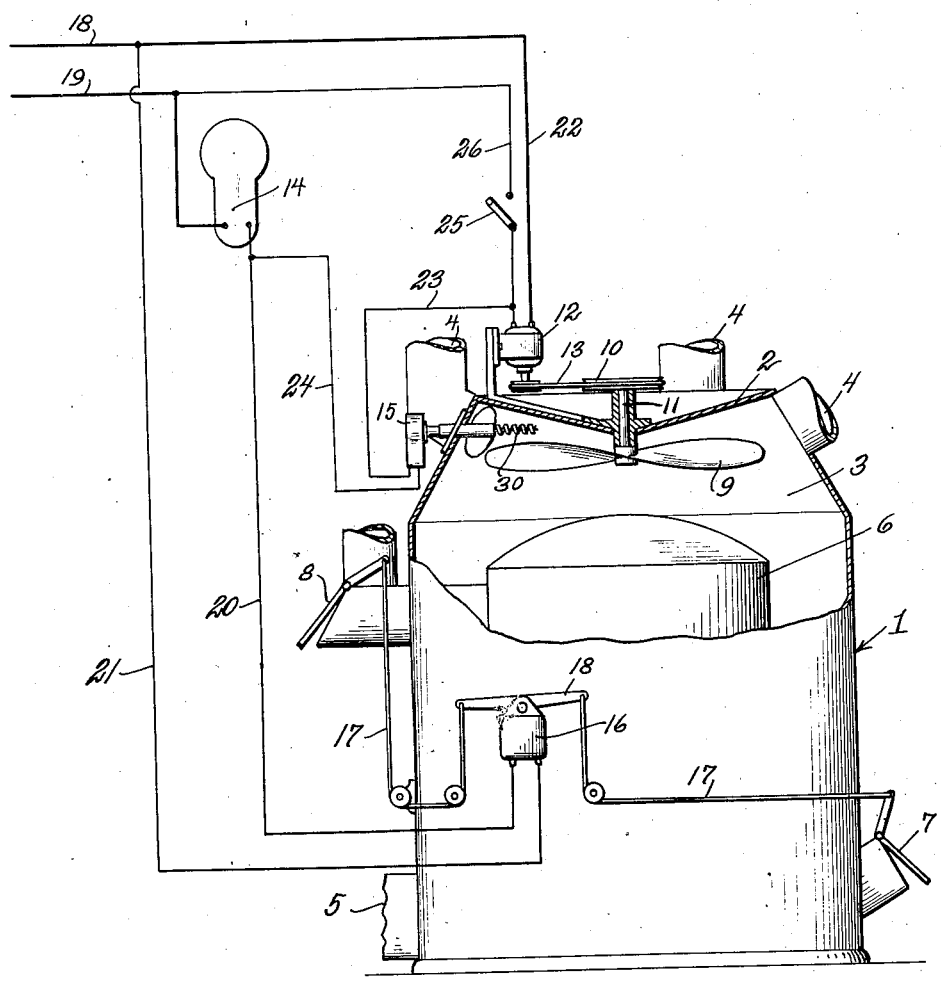
Figure 1 is a side elevation of a furnace having an embodiment of my invention incorporated therewith, a room thermostat and the suitable electrical connections being illustrated diagrammatically and a portion of the furnace being broken away to illustrate the relative position of the parts.
Figure 2:
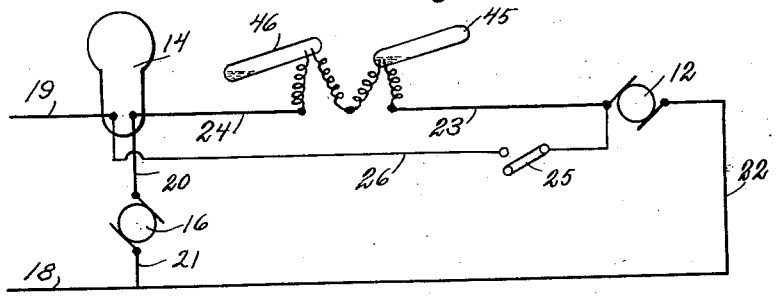
Fig. 2 is a diagrammatic view of the electrical wiring and control devices illustrated in Figure 1.

Referring now to the drawings in detail, the embodiment illustrated comprises an ordinary hot air furnace 1, comprising a casing or stack terminating at its upper end in the usual bonnet 2 and having an air chamber 3 therein. The bonnet is provided with suitable hot air distributing outlets comprising tubes or risers 4 for distributing the hot air from the chamber 3 to the space to be heated. Cold air enters the furnace through an air pipe 5 and passes upwardly around a heating element 6 having a combustion chamber therein which is provided with suitable combustion controlling elements such as a damper 7 and a check draft 8. The air is heated as it passes around the heating element 6 and is distributed from the bonnet 3 through the tubes or risers 4.

In order to provide an increased circulation of air to the space to be heated, a fan 9 is mounted in the bonnet 2 and in a position to force the air upwardly through the air circulation tubes. A pulley 10 is secured to the fan shaft 11 and may be driven from the motor 12 by means of a belt 13. The electrical operation of the fan motor 12 is controlled to operate the fan relative to the temperature of the space to be heated, by means of a room thermostat 14 and a thermo-electric furnace switch 15 wired in series with the fan motor in a power circuit. The furnace switch is positioned above the fan and in a position to be controlled by the temperature of the air in the bonnet 2 and has incorporated therein suitable mercury electric contactors operable at predetermined temperatures.

The damper 7 and the check draft 8 are controlled by means of a combustion control motor 16 to which they are connected by means of cables 17 and a lever 18. The operation of the motor 16 will open the damper 7 and simultaneously close the check draft 8. The motor 16 is arranged to control the operative connections of a combustion controlling mechanism, such as an oil burner or other heating means, and it will be understood that the cables 17 may be operatively connected to the controlling members of an oil burner or any suitable heating mechanism.

The combustion control motor and the fan motor are operated from the usual lighting circuit comprising power lines 18 and 19. The room thermostat 14 is of the usual type and provided with means for making and breaking the circuit relative to predetermined room temperatures. When the room temperature falls below a predetermined point, the thermostat 14 will operate to close the usual switch contacts therein and a circuit will be completed from the power line 19 through the thermostat, a conductor 20 connected thereto, the motor 16, and a return conductor 21 to the power line 18, and the motor will operate to control the damper and check draft, or other combustion control mechanism, to increase combustion, and raise the temperature of the air passing through the furnace. When the room temperature rises to the predetermined degree, the circuit will be broken and the combustion control will return to normal condition.

It is undesirable and unnecessary to operate the fan until the temperature in the chamber 3 rises above a predetermined degree, as it would circulate cool air from the inlet pipe 5 and force it through the space to be heated and retard the desired rise in room temperature. The furnace switch 15 is therefore connected in series with the fan motor 12 and the thermostat 14, in order that the operation of the fan will be relative to the temperature in the furnace hood 2 and to the room temperature.

The fan motor 12 is operated from the main power lines through a conductor 22 connected thereto from the power line 18, and a conductor 23 connected therefrom to the furnace switch 15, the return circuit being through conductor 24 connected to the power line 19 through the room thermostat 14. The thermostat furnace switch and motor are connected in series with the power circuit. It will thus be seen that when the furnace switch 15 is in a condition so that the mercury electric contactors therein maintain a closed circuit therethrough, the motor 12 will operate the fan 9 when the contacts of the thermostat 14 are closed.

A switch 25 in a conductor 26 which is also connected from the feed line 19 to the motor 12 may be used to shunt the furnace switch and rheostat and control the operation of the fan when desired, for instance during warm weather when there is no fire in the furnace and it is desired to provide an unheated air circulation.

The thermo-electric furnace switch 15 is illustrated in detail in Figs. 3 to 6 inclusive, and comprises a casing 27 having a rearwardly extending sleeve 28 secured thereto and a longitudinal rotatably mounted shaft 29 extending therethrough. A thermostatic element 30 is secured to the sleeve 28 at 31 and is preferably in the form of an outwardly extending helical bimetallic coil, the outer end of which is secured to the upwardly extending end of the shaft by means of securing nuts 33. A bracket 34 is secured to the furnace wall and the sleeve 28 is slidably mounted therein and secured by means of a set screw 35. When the temperature in the furnace bonnet rises the expansion of the thermostatic element will cause the shaft 29 to rotate in a clockwise direction and as the temperature falls it will rotate in a counter-clockwise direction.

The sleeve 28 is apertured at 28ª to permit a certain amount of cold air to be drawn through the sleeve for the purpose of ventilating or cooling the thermostatic member 30. The amount of air drawn in by reason of the draft inside the bonnet may be regulated by adjusting the sleeve member until the desired control of the thermostatic member is obtained. This regulation is desirable so that the thermostatic member will respond to certain temperature conditions within the bonnet 2 of the furnace 1.

Upwardly extending contactor supporting arms 36 and 37 are adjustably mounted on the shaft 29 and engaged between suitable friction washers thereon, the arm 36 being engaged by the friction washers 38 and the arm 37 being engaged by friction washers 39, the frictional engagement being secured by means of springs 40 and 41, respectively. Lock nuts 42, 43 and 44 are provided to adjust the compression of the springs 40 and 41. Mercury electric contactors 45 and 46 are mounted on the arms 36 and 37, respectively, by means of suitable clips 47 and 48 secured to the arms. These contactors are preferably in the form of closed glass tubes or capsules forming containers for a small amount of mercury therein for making or breaking the circuit between suitable electrodes in accordance with the angle of inclination of the movable containers, the angular movement being controlled by the expansion and the contraction of the thermostatic element 30 and the consequent rotation of the shaft 29.

Figure 3:
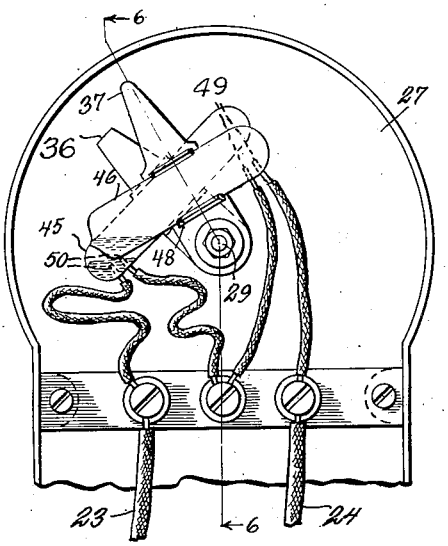
Fig. 3 is a front elevation of the thermo-electric furnace switch with the cover removed and a portion of the casing broken away, the mercury electric contactors being shown in normal open circuit position.

The container 46 is provided with a pair of spaced electrodes 49 and the container 45 with spaced electrodes 50. These electrodes are arranged in series between the fan motor circuit conductors 23 and 24, as shown in Fig. 3, and when the contactors stand in the position therein illustrated, the circuit will be closed through the electrodes 50 by the mercury in the container 45, and the circuit is open between the electrodes 49 as the container 46 is tilted at such an angle that the mercury therein is at the opposite or lowered end of the container.

Figure 4:
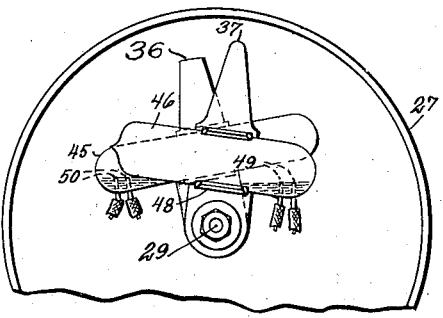
Fig. 4 is a fragmentary detail of the thermo-electric furnace switch with the mercury contactors moved to a position to maintain a closed circuit therethrough at the desired temperature in the furnace bonnet.
Figure 6:
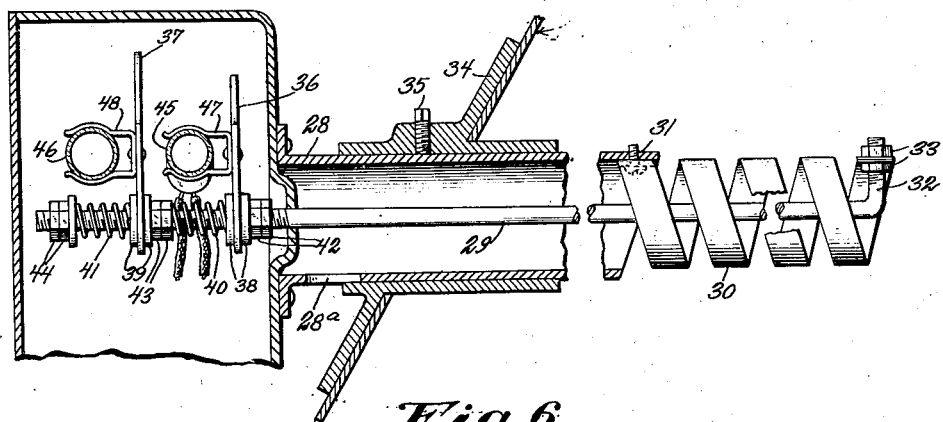
Fig. 6 is a longitudinal sectional view through the furnace switch, taken on a line corresponding to line 6—6 of Fig. 3.

When the room thermostat switch closes, due to reduced room temperature, the combustion control motor 16 will be operated to increase combustion and thereby raise the temperature in the furnace bonnet 3, and as the bonnet temperature rises the contactors 45 and 46 are moved in a clockwise direction until at a predetermined bonnet temperature they reach a position substantially as illustrated in Fig. 4 when the circuit will be closed to operate the fan motor 12.

Figure 5:
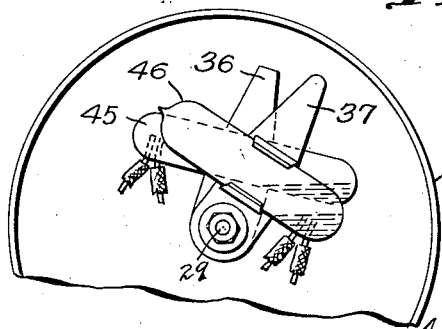
Fig. 5 is a front elevation of the furnace switch contactors, similar to that shown in Fig. 4, illustrating the position of the contactors after the temperature in the furnace bonnet has risen to a point above the desired temperature, the circuit being broken.

The fan will then operate until the room temperature rises to a predetermined degree to cause the room thermostat to break the circuit, or until the bonnet temperature rises sufficiently to move the contactors to break the circuit as shown by the position of the contactors in Fig. 5. The circuit will remain broken as long as the room temperature or the furnace bonnet temperature remains above its respective predetermined high degree.

If the bonnet temperature again falls below its predetermined high degree the contactors 45 and 46 will return to the position shown in Fig. 4. If at that time the room temperature is reduced sufficiently to cause the thermostat contacts to be closed, the circuit will be completed through all of the contacts and the fan will again operate. However, it will be obvious that the fan can only operate when the room temperature is below a predetermined degree regardless of the position of the contactors 45 and 46.

The frictional mounting of the contactors 45 and 46 allows them to be manually adjusted to the desired relative position, whereby the relative high and low circuit-making and breaking temperatures may be predetermined as desired, and in which positions the contactors will be retained by the friction means and the circuit will be closed and broken at definite temperature settings and cover a definite temperature range.

The device may be adjusted to cover any desired temperature range. For example, the relative position of the contactors may be adjusted to allow the fan motor 12 to start when the furnace bonnet temperature reaches 170° F. and to stop the fan motor if the bonnet temperature goes above 220° F. If the bonnet temperature falls to 220° the fan motor will again start and continue to operate until the furnace bonnet temperature falls below 170° or rises again above 220°. This condition obtains while the room thermostat is closed and is of course a cooperative operation dependent upon the condition of the room thermostat.

The device may be adjusted to cover a greater or lesser range of temperature as desired.

Briefly, the operation is substantially as follows:
When thermostat 14 calls for heat, the combustion regulating circuit is closed from the power circuit through conductor 20, motor 16, and conductor 21 to operate the combustion controlling mechanism. When the temperature in the bonnet of the furnace reaches the predetermined high degree, the operation of the furnace switch 15 will close the fan motor circuit from the power lines through the conductors 22, 23 and 24 and through the thermostat 14.

While I have illustrated only one embodiment of my invention, it will be apparent to those skilled in the art that changes and modifications may be made without departing from the spirit of the invention, and I therefore desire to be limited only by the prior art and the appended claims.

Having thus described my invention, what I claim and desire to secure by Letters Patent is:

1. A temperature control device, comprising a furnace having a combustion chamber therein and a heating chamber having a cold air inlet and a hot air outlet, air circulating means between said combustion chamber and said hot air outlet, a room thermostat, and a temperature responsive means located in the path of flow of hot air from said furnace and cooperating with said room thermostat to control said circulating means relative to the room temperature and the furnace temperature.

2. A temperature control device, comprising a furnace having a combustion chamber therein and a heating chamber having a cold air inlet and a hot air outlet, air circulating means located between said combustion chamber and said outlet, a room thermostat, and a temperature responsive means located substantially between said circulating means and said outlet and cooperating with said room thermostat to cause the operation of said circulation means relative to the room temperature and the furnace temperature.

3. A temperature control device, comprising a furnace having a combustion chamber therein and a heating chamber having a cold air inlet and a hot air outlet, a combustion control means, a room thermostat arranged to control said combustion control means relative to the room temperature, a hot air circulating means between said combustion chamber and said hot air outlet, and a temperature responsive means located in the path of flow of hot air from said air circulating means and cooperating with said room thermostat to control said air circulation means relative to the temperature of the hot air arising from said combustion chamber.

4. In combination, a hot air furnace having an air passage therethrough and a combustion controlling means associated therewith, means for producing a forced circulation of air through said passage, temperature controlled means located adjacent the outlet of said passage for controlling said circulation means, a room thermostat for controlling the combustion controlling means at predetermined room temperatures and to make effective the furnace temperature controlled means at predetermined furnace temperatures, and additional independent means for controlling said circulation means.

5. A temperature control device, comprising a furnace having a combustion chamber therein and a heating chamber having a cold air inlet and a hot air outlet, air circulating means between said combustion chamber and said hot air outlet, a room thermostat, and a temperature responsive means located in contact with the flow of hot air from said circulating means and cooperating with said room thermostat to control said circulating means relative to the room temperature and the furnace temperature, and means independent of said room thermostat and said furnace temperature responsive means for controlling the operation of said air circulating means.

6. A system for air circulation control in hot air furnaces comprising a fan motor for controlling hot air circulation, a power circuit for operating said motor, a furnace temperature responsive means in said furnace adjacent the hot air outlets, a plurality of switches in series in said circuit and operable in predetermined sequence by said temperature responsive means, a combustion controlling motor, a power circuit for said combustion motor, a room thermostat common to both of said circuits for controlling said combustion motor and said fan motor, the sequential operation of said furnace temperature responsive switches and said room thermostat cooperating to maintain a substantially uniform room temperature.

7. A system for air circulation control in hot air furnaces comprising a fan motor for controlling hot air circulation, a power circuit for operating said motor, a furnace temperature responsive means in said furnace adjacent the hot air outlets, a plurality of switches in series in said circuit and operable in predetermined sequence by said temperature responsive means, a combustion controlling motor, a power circuit for said combustion motor, a room thermostat common to both of said circuits for controlling said combustion motor and said fan motor, the sequential operation of said furnace temperature responsive switches and said room thermostat cooperating to maintain a substantially uniform room temperature, and a means for shunting said furnace temperature responsive switches and said room thermostat to operate said fan motor at any room temperature.

8. A temperature control device of the character described, comprising a furnace including a stack having a combustion chamber therein, said stack having a cold air inlet and a hot air outlet, means adjacent the outlet and operable for increasing the air circulation, furnace temperature responsive means adjacent said air circulation means and between said circulating means and said outlet, and a room thermostat, said thermostat and said furnace temperature responsive means cooperating to operate said circulating means relative to the room temperature and furnace temperature.

9. A temperature control device, comprising a hot air furnace having a heating surface and an air chamber provided with a cold air inlet and a hot air outlet, air circulating means for passing air from the cold air inlet over the heating surface and out of the hot air outlet, a temperature responsive means located between the heating surface and the hot air outlet for rendering the air circulating means operative when the heated air reaches a predetermined temperature, and additional independent means for controlling said circulation means.

10. A temperature control device, comprising a hot air furnace having a heating surface and an air chamber provided with a cold air inlet and a hot air outlet, air circulating means for passing air from the cold air inlet over the heating surface and out of the hot air outlet, and a temperature responsive means located between the heating surface and the hot air outlet for rendering the air circulating means operative when the heated air reaches a predetermined temperature, and arranged to again render the air circulating means inoperative when the heated air reaches a predetermined higher temperature.

11. A system of the class described comprising in combination with a hot air furnace, of an electrically operated heat increasing means therefor which when energized acts to increase the temperature of the furnace and when de-energized to decrease the temperature of the furnace, an electrical fan for circulating the air heated by the furnace, a thermostatic switch having its thermostat in the path of the heated air, a room thermostat, a circuit for the fan controlled by said room thermostat and thermostatic switch, a circuit for said heat increasing means controlled solely by said room thermostat, and additional independent means for controlling said fan.

12. In combination, an air conditioning device, means for producing a forced circulation of air therethrough, and temperature responsive means for controlling the actuation of said circulation producing means, said temperature responsive means including mechanism acting to cause actuation of said circulation producing means at temperature within a normal range and to cause inaction thereof at temperatures both above and below the said normal temperature range.

13. In combination, an air conditioning device, means for producing a forced circulation of air therethrough, temperature responsive means for controlling the actuation of said circulation producing means, said temperature responsive means including mechanism acting to cause actuation of said circulation producing means at temperature within a normal range and to cause inaction thereof at temperatures both above and below the said normal temperature range, and means for adjusting the mechanism of said temperature responsive means whereby the said normal range of temperature at which said circulating means is caused to operate may be governed both as to extent between minimum and maximum and as to minimum and maximum degree.

14. In combination, an air conditioning device for a space, means for producing a forced circulation of air through the device and into the space, and temperature responsive means responsive to a temperature other than that of the space for controlling the actuation of said circulation producing means, said temperature responsive means including mechanism acting to cause actuation of said circulation producing means at temperatures within a normal range and to cause inaction thereof at temperatures both above and below the said normal temperature range.

15. In combination, means for producing a forced circulation of a fluid into a space, and temperature responsive means for controlling the actuation of said circulation producing means, said temperature responsive means including mechanism acting to cause actuation of said circulation producing means at temperatures within a normal range and to cause inaction thereof at temperatures both above and below the said normal temperature range.

16. In combination, an air conditioning device for a space, means for producing a forced circulation of air through the device and into the space, temperature responsive means responsive to a temperature other than that of the space for controlling the actuation of said circulation producing means, said temperature responsive means including mechanism acting to cause actuation of said circulation producing means at temperatures within a normal range and to cause inaction thereof at temperatures both above and below the said normal temperature range, and means for adjusting the mechanism of said temperature responsive means whereby the said normal range of temperature at which said circulating means is caused to operate may be governed both as to extent between minimum and maximum and as to minimum and maximum degree.

17. In combination, means for producing a forced circulation of a fluid into a space, temperature responsive means for controlling the actuation of said circulation producing means, said temperature responsive means including mechanism acting to cause actuation of said circulation producing means at temperatures within a normal range and to cause inaction thereof at temperatures both above and below the said normal temperature range, and means for adjusting the mechanism of said temperature responsive means whereby the said normal range of temperature at which said circulating means is caused to operate may be governed both as to extent between minimum and maximum and as to minimum and maximum degree.

18. In combination, an air conditioning device for a space, means for producing a forced circulation of air through the device and into the space, first and second switches, thermostatic means responsive to a temperature other than that of the space and actuating said first and second switches, said first switch acting to close an electric circuit at temperatures below a certain degree and vice versa, said second switch acting to close an electric circuit at temperatures above a certain degree and vice versa, said electric circuits being in series and when completed acting to operate said circulation producing means and vice versa for the purpose of causing said circulation producing means to actuate within a normal range of temperatures and to cease actuation both above and below said normal range.

19. In combination, means for producing a forced circulation of a fluid into a space, first and second switches, thermostatic means responsive to a temperature other than that of the space and actuating said first and second switches, said first switch acting to close an electric circuit at temperatures below a certain degree and vice versa, said second switch acting to close an electric circuit at temperatures above a certain degree and vice versa, said electric circuits being in series and when completed acting to operate said circulation producing means and vice versa for the purpose of causing said circulation producing means to actuate within a normal range of temperatures and to cease actuation both above and below said normal range.

20. In combination, a space to be heated, a heater for supplying heat to the space, means for varying the amount of heat delivered by the heater to the space, and temperature responsive means responsive to a temperature other than that of the space to be heated for controlling said heat varying means, said temperature responsive means including mechanism acting to cause actuation of said heat varying means at temperatures within a normal range and to cause inaction thereof at temperatures both above and below the said normal temperature range.

21. In combination, a space to be heated, a heater for supplying heat to the space, means for varying the amount of heat delivered by the heater to the space, temperature responsive means responsive to the temperature of the space to be heated for controlling said heat varying means, and temperature responsive means responsive to a temperature other than that of the space to be heated for additionally controlling said heat varying means, said last temperature responsive means including mechanism acting to permit actuation of said heat varying means at temperatures within a normal range and to cause inaction thereof at temperatures both above and below the said normal temperature range.

DAVID J. JONES.